Nov. 7, 1939.  A. D. ENRIQUEZ ET AL  2,178,853
PNEUMATIC TIRE-TUBE TESTING CASE
Filed Feb. 21, 1938  2 Sheets-Sheet 1
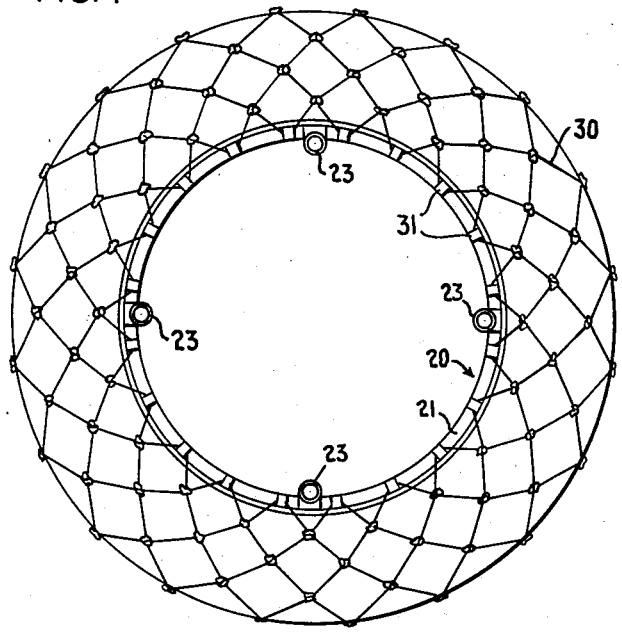
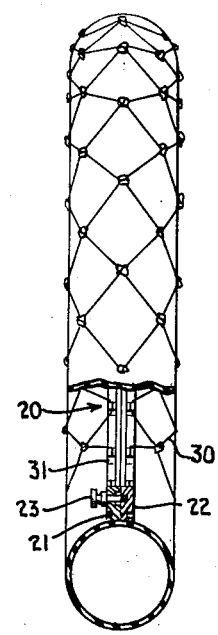
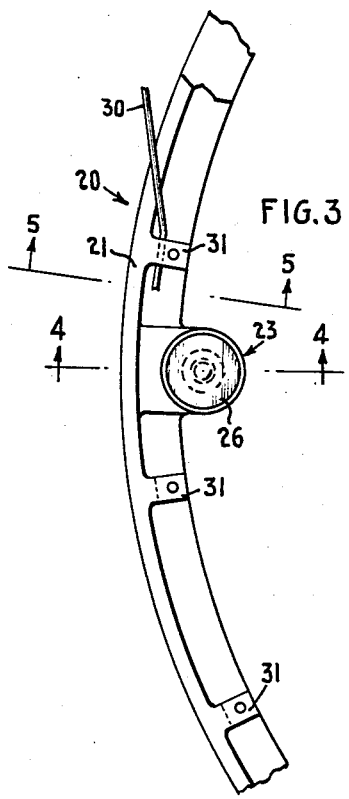
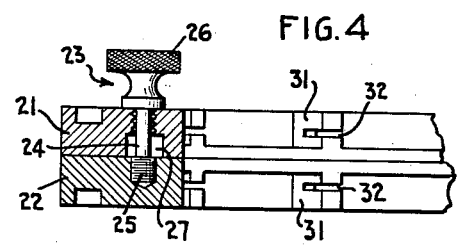
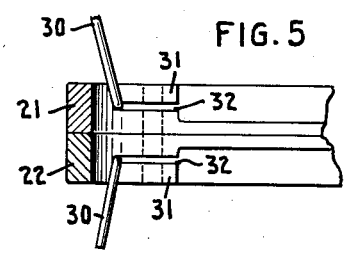
ANGEL D. ENRIQUEZ
PAUL SUSSMAN
INVENTORS
BY Victor J. Evans & Co.
ATTORNEYS Nov. 7, 1939.  A. D. ENRIQUEZ ET AL  2,178,853
PNEUMATIC TIRE-TUBE TESTING CASE
Filed Feb. 21, 1938  2 Sheets-Sheet 2

ANGEL D. ENRIQUEZ
PAUL SUSSMAN
INVENTORS

BY *Victor J. Evans & Co.*
ATTORNEYS

UNITED STATES PATENT OFFICE 2,178,853

PNEUMATIC TIRE-TUBE TESTING CASE

Angel D. Enriquez and Paul Sussman, Brooklyn, N. Y.

Application February 21, 1938, Serial No. 191,792

3 Claims. (Cl. 73—51)

This invention relates to improvements in devices useful for the testing of pneumatic tires and more particularly to an improved device for use in detecting punctures in a pneumatic tire inner tube by the so-called emersion test.

It is among the more important objects of the present invention to provide a new and improved device useful in detecting punctures in pneumatic tire inner tubes by the so-called emersion test. In testing inner tubes in this manner it is commonly the practice to inflate the tube and submerge same partially, if not wholly, in a body of fluid, such as water, whereby the puncture or leak can be readily located by escaping bubbles of gas passing through said puncture into the surrounding fluid. There are several disadvantages concomitant upon practicing this test, as hereinbefore described; particularly experience indicates that often the inner tube prior to testing is inflated too much and bursts, especially if it is the object of the test to detect so-called high pressure punctures. Furthermore, inflation of the inner tube until the gas contained therein is under relatively high pressure greatly increases the bulk thereof and thereby necessitates the use of a relatively large tank and causes the test to become a somewhat clumsy and cumbersome procedure. As hereinbefore mentioned, it is an object of the present invention to avoid the difficulties heretofore concomitant upon detecting punctures in inner tubes by the so-called emersion test.

It is also an object of the present invention to provide a device for facilitating testing of inner tubes by emersion which, when not in use, can be conveniently stored in relatively small space by collapsing and/or dissociating elements comprising the structure, that is to say, it is among the features of the device according to the present invention that the parts thereof can be folded or dissociated to diminish the bulk of the device for purposes of storage or transportation.

Regarded in certain of its broader aspects the present invention includes a pair of connectible annuli and an annular, cannular, cribriform, foraminous or net-like member associated with and carried on said annuli adapted to encompass an inflated inner tube, whereby the diameter of the inflated tube is substantially restricted by the cribriform or foraminous member.

In certain of its less broad aspects, the present invention includes a pair of connectible annular members, each comprising a plurality of associated cooperating segmental elements and a net-like member mounted on hook-like formations carried on said annuli whereby an inner tube can be positioned within said net and inflated. The expansion of the inflated tube, of course, is restricted by the net circumjacent thereof and, accordingly, in detecting high pressure leaks, that is to say when the tube is filled with gas under considerable, or at least abnormally high pressure, the net will serve to limit the size of the inflated tube and also will assist in holding the tube during the emersion test.

In order to facilitate a fuller and clearer understanding of the matter of the present invention a certain specific embodiment thereof, herein illustrated, will be hereinafter described, it being expressly understood of course that the illustrated embodiment is given solely by way of example and is non-limitative.

Referring then to the drawings—

Fig. 1 is a front elevational view of the now preferred embodiment of the present invention;

Fig. 2 is substantially a side elevational view of the structure illustrated in Fig. 1, parts being broken away for clearness;

Fig. 3 is a fragmentary front elevational view of a portion of the structure shown in Fig. 1, illustrating details of construction;

Fig. 4 is substantially a sectional view of Fig. 3, taken along the line 4—4;

Fig. 5 is substantially a sectional view of Fig. 3 taken along the line 5—5;

Figure 6:
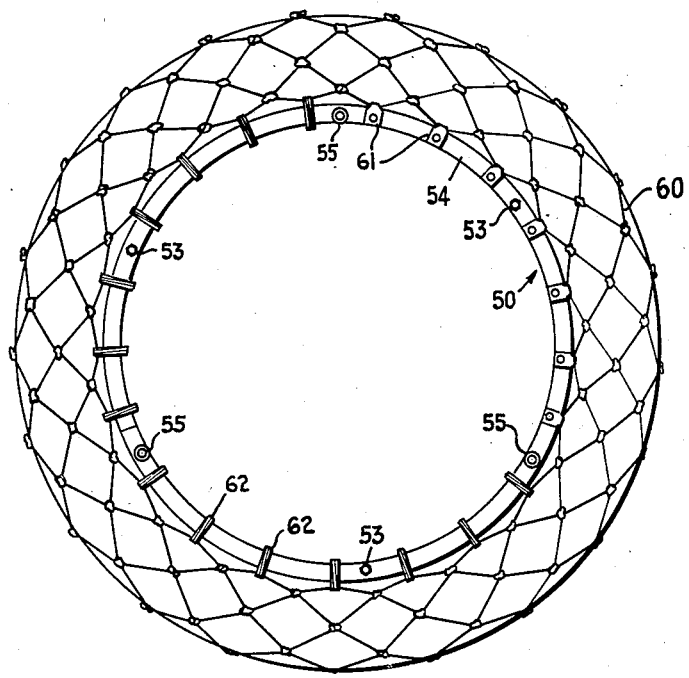
Fig. 6 is a front elevational view of a modified form of the device according to the present invention.
Figure 7:
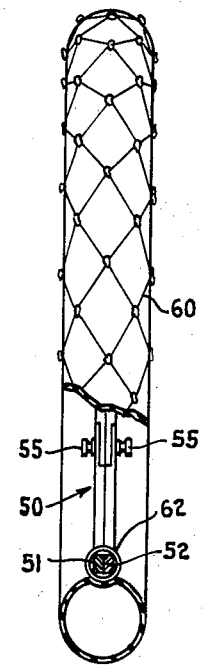
Fig. 7 is substantially a side elevational view of the structure illustrated in Fig. 6 with parts broken away for purposes of clearness and illustration.

Two embodiments of the present invention are herein illustrated, in one of which the annular composite ring member is formed of one piece of material and in the other of which it is formed of several cooperating, connectible, segmental elements. The first mentioned embodiment, which is best illustrated in Figs. 1–5 inclusive, will now be described. Referring then to the drawings, the device comprises a frame generally designated at 20, substantially circular in outline and essentially uniform in cross-section, adapted to be positioned within a pneumatic tire inner tube. The frame 20 comprises a pair of annular members 21 and 22 having alignable tapped openings formed therein and spaced around the members whereby said members can be positioned adjacent each other and held in cooperative union by means including a plurality of connecting members 23, each of said connecting members comprising a shank 24 having a threaded end portion 25 and associated with a knurled knob 26, substantially as shown in Fig. 4. It is to be noted that the threaded portion 25 of the shank is engageable with tapped openings formed in the members 21 and 22 as aforesaid, and it is also to be noted that a cavity 27 is provided in the member 21, whereby when the threaded portion 25 of the shank is disengaged from the tapped opening formed in the member 22, it can rest in the opening 27 without necessitating removal of the fastening means 23 from its position in the member 21. It will be observed that the shank 24 corresponds in external diameter to the bottom diameter of the threads formed in the portion 25 of the shank, whereby the threads in the tapped opening formed in the member 21 abut against and serve as bearing surface of the member 24. This arrangement it has been found facilitates engagement and fastening together of the annular members 21 and 22, inasmuch as they can be positioned adjacent each other with the threaded portion 25 of the shank positioned within the opening 27, and after alignment of the respective openings in the members 21 and 22 the connecting means 23 can be advanced whereby the threaded portions of said connecting means engage with the tapped openings formed in the member 22. It will be observed that upon advancing the threaded portion 25 in the opening formed in the member 22, shoulder portions of the knob 26 will abut against the outer face of the member 21 thereby pressing the members toward each other.

An annular net-like member 30 is split along the inner side and the edges of the split attached to the annuli by fastening means 31. Details of the fastening means are best illustrated in Figs. 3, 4 and 5, where it will be observed that radially extending slots 32 are formed in block-like members 31 mounted on the annuli 21 and 22 at spaced intervals, these slot-like openings being open toward the center of the annulus and being adapted to receive and hold loops formed in the netting 30. It is to be noted that the loops formed in the net are freely slidable in the slots 32, whereby the net can be easily and quickly associated or dissociated from the cooperative association with the annuli as requirements of use may dictate. In use, as will be hereinafter described, the composite frame 20 is positioned with the tire inner tube circumjacent same and the netting 30 is attached to the fastening means upon the annular frames 21 and 22, whereby the netting is disposed around the inner tube, substantially as shown in Fig. 1. Manipulation of the fastening means 23 serves to integrate the elements comprising the frame 20.

Figure 8:
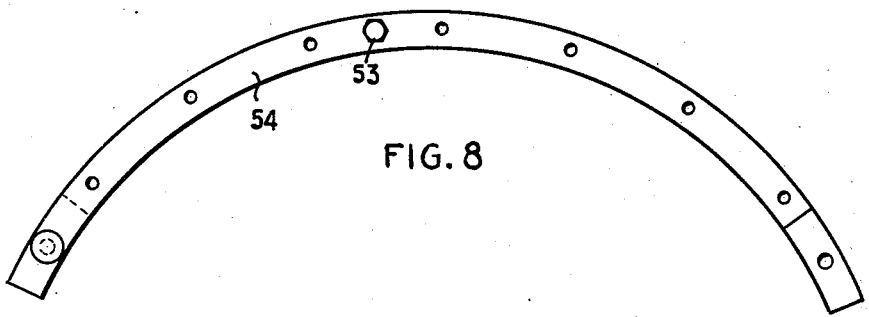
Fig. 8 is a front elevational view of one of the segmental elements comprising the annuli.
Figure 9:
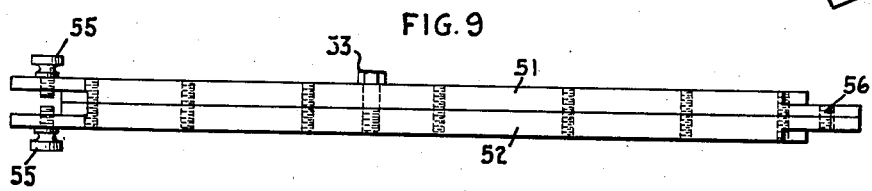
Fig. 9 is a top plan view of the structure illustrated in Fig. 8.

Under certain conditions as, for example, when it is desired to include the pneumatic tire inner tube testing device in a kit of tools to be carried in a vehicle, it is both apposite and exigent that the bulk of the device be minimized. An embodiment of the present invention wherein this feature is emphasized is illustrated in Figs. 6–11 inclusive. In this embodiment of the present invention a composite frame is provided comprising a plurality of annuli connectible and each comprising a plurality of interconnected segmental elements. More especially, the composite annular frame 50 comprises a pair of connected annular elements 51 and 52 attached to each other by fastening means as, for example, the threaded members 53. Each of the members 51 and 52 comprises a plurality of segmental elements, one of which is designated by the numeral 54, said elements being interconnected by fastening means 55 engaging with threaded openings 56 formed in abutting end portions of adjoining members. It is to be noted the end portions of the elements are provided with cooperating tongue and groove members, substantially as shown in Figs. 8 and 9, to assist in holding the elements in cooperative relationship and also to augment the strength of the composite structure.

Figure 10:
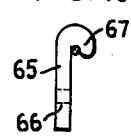
Figs. 10 and 11 are side and front views, respectively, of one of the hook elements whereby the net-like member is attached to the annuli.
Figure 11:
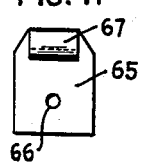

An annular net-like member 60 corresponding to the net 30 in the hereinbefore described embodiment of the present invention is attached to the annular elements comprising the frame 50 by fastening means 61 mounted on one of the segmental elements and by rings 62 encompassing loops formed in the netting and the elements of the frame. The fastening members 61 are best illustrated in Figs. 10 and 11 and comprise a block of material 65 having an opening 66 formed therein to facilitate attaching said block to the segmental frame elements and including a hook-like formation 67 in an edge thereof adapted to receive and hold a loop formed in the annular, cannular net 60. The rings 62 are split rings of conventional type, adapted to receive loop formations in the net 60 and to encompass the segmental frame elements. In use, the composite frame 50 is positioned in the center of the pneumatic tire inner tube and the net 60 is attached to the fastening means 61 and 62 and positioned circumjacent the inner tube. It is to be noted that the ring 62 can be slipped over and thereby disengaged from the elements comprising the annular frame 50 after the fastening means 53 and 55 have been removed therefrom. Thus it will be seen that the net can remain attached to one of the segmental elements though dissociated from engagement with the others, whereby the bulk of the device for purposes of storage is minimized.

In use, the inner tube is positioned within the net and loops formed in the net to fastening means associated with the annular frame, the elements of said frame being then associated with each other and the inner tube is inflated. After inflation the tube is emersed in a body of fluid, as for instance water, and punctures or openings formed in the tube are detected by a stream of escaping bubbles from the place of opening. The effect is, of course, materially enhanced and the value of the test augmented by filling the tube under relatively high pressure, whereby leaks of almost negligible size can be easily and quickly detected.

It will be apparent, of course, to those skilled in the art that certain modifications of the testing device according to the present invention can be made without departure from the scope or spirit thereof as expressed in the appended claims, for example, other fastening means could be employed than those herein set forth and described for attaching the net to the frame. Moreover, other materials than simply netting could be employed to encompass and constrain the inner tube during testing, it being understood, of course, that it is essential that the material be substantially foraminous in order to permit location of the punctures or openings in the inner tube during test. Furthermore, in the second described embodiment of the present invention a greater or lesser number of segmental frame elements could be utilized as conditions might indicate, it being expressly understood that although the frames illustrated and described in connection with this embodiment of the invention utilize three elements, a greater or lesser number might be employed advantageously under certain conditions.

What is claimed is:

1. A device useful in the emersion testing of pneumatic tire inner tubes, comprising a composite annular frame, said frame comprising a pair of congruent substantially coextensive similar annular members, fastening means including threaded screw elements engaging with tapped openings formed in said members for associating and holding same in abutting relationship, each of said annular members comprising a plurality of interfitting connected segmental elements, said composite frame being adapted to be positioned within the central opening of a pneumatic tire inner tube, an annular, cannular, net-like member adapted to be positioned circumjacent a pneumatic tire inner tube, and fastening means mounted on and carried by parts of said composite frame adapted to receive and hold loop-like formations in said net-like member fixedly with respect to certain of said segmental elements but removably with respect to others of said elements.

2. A device useful in the emersion testing of pneumatic tire inner tubes, comprising a composite annular frame, said frame comprising a pair of congruent substantially coextensive similar annular members, fastening means including threaded screw elements engaging with tapped openings formed in said members for associating and holding same in abutting relationship, each of said annular members comprising a plurality of interfitting connected segmental elements, said composite frame being adapted to be positioned within the central opening of a pneumatic tire inner tube, an annular, cannular, net-like member adapted to be positioned circumjacent a pneumatic tire inner tube, and fastening means mounted on and carried by parts of said composite frame adapted to receive and hold loop-like formations in said net-like member, said fastening means including hook elements fixedly mounted on parts of said frame and rings sliding upon other parts of said frame whereby said net-like member is fixedly attached to certain of said segments but removably attached to others of said segments.

3. A device useful in the emersion testing of pneumatic tire inner tubes, comprising a composite annular frame, said frame comprising a pair of congruent substantially coextensive similar annular members, fastening means including threaded screw elements engaging with tapped openings formed in said members for associating and holding same in abutting relationship, each of said annular members comprising a plurality of interfitting connected segmental elements, said composite frame being adapted to be positioned within the central opening of a pneumatic tire inner tube, an annular, cannular, net-like member adapted to be positioned circumjacent a pneumatic tire inner tube, fastening means engageable with loop formations in said netting adapted to associate and cooperatively unite said net-like member and said frame, said fastening means including a plurality of block-like members mounted on parts of said frame and provided with hook formations engaging with parts of said net-like member for fixedly connecting said net-like member to certain of said segmental elements, and auxiliary fastening means comprising a plurality of split ring elements slidable on parts of said frame receiving and holding loop formations in said net-like member in removable connection with other of said segmental elements.

ANGEL D. ENRIQUEZ.
PAUL SUSSMAN.